United States Patent [19]
McCamy et al.

[11] Patent Number: 5,690,218
[45] Date of Patent: Nov. 25, 1997

[54] COMPACT DISC STORAGE CASE

[75] Inventors: William Gary McCamy, 4353 Highborne Dr., Marietta, Ga. 30066; Calvin Lee Payne, Jr., Jasper, Ga.

[73] Assignee: William Gary McCamy, Marietta, Ga.

[21] Appl. No.: 676,586

[22] Filed: Jul. 8, 1996

Related U.S. Application Data

[63] Continuation-in-part of Ser. No. 366,625, Dec. 30, 1994, Pat. No. 5,533,615.

[51] Int. Cl.⁶ .................................. B65D 85/57
[52] U.S. Cl. ................... 206/303; 206/308.1; 206/309
[58] Field of Search ................... 206/303, 307–313, 206/308.1, 308.2

[56] References Cited

U.S. PATENT DOCUMENTS

| | | | |
|---|---|---|---|
| 774,037 | 11/1904 | Burgi . | |
| 4,641,747 | 2/1987 | Mestdagh et al. | 206/309 |
| 4,722,439 | 2/1988 | Grobecker et al. | 206/309 |
| 4,771,890 | 9/1988 | Hofland et al. | 206/308.1 |
| 4,805,770 | 2/1989 | Grobecker et al. | 206/308.1 |
| 4,867,302 | 9/1989 | Takahashi et al. | 206/308.1 |
| 4,964,510 | 10/1990 | Loyd | 206/306 |
| 5,000,316 | 3/1991 | Lerner | 206/309 |
| 5,168,991 | 12/1992 | Whitehead et al. | 206/308.1 |
| 5,219,417 | 6/1993 | O'Brien et al. | 206/512 |
| 5,236,081 | 8/1993 | Fitzsimmons et al. | 206/44 R |
| 5,267,647 | 12/1993 | Stumpff et al. | 206/308.1 |
| 5,284,242 | 2/1994 | Roth et al. | 206/310 |
| 5,573,120 | 11/1996 | Kaufman et al. | 206/310 |
| 5,574,716 | 11/1996 | Uchida | 206/308.1 |

FOREIGN PATENT DOCUMENTS

| | | | |
|---|---|---|---|
| 0252226 | 1/1988 | European Pat. Off. | 206/309 |
| 0302549 | 2/1989 | European Pat. Off. | 206/308.1 |
| 131182 | 1/1988 | Japan | 206/308.1 |

*Primary Examiner*—Jimmy G. Foster
*Attorney, Agent, or Firm*—Bernstein & Associates

[57] ABSTRACT

A container for storing a disc comprising a planar surface having a recessed receptacle therein, a lip projecting from the planar surface over the recess, and a pivotable lip attached to a button, the button being attached to an elongated flexible tab, which in turn is attached to the planar surface. When the button is depressed, the pivotable lip pivots away allowing the insertion or removal of a disc from the storage container.

4 Claims, 3 Drawing Sheets

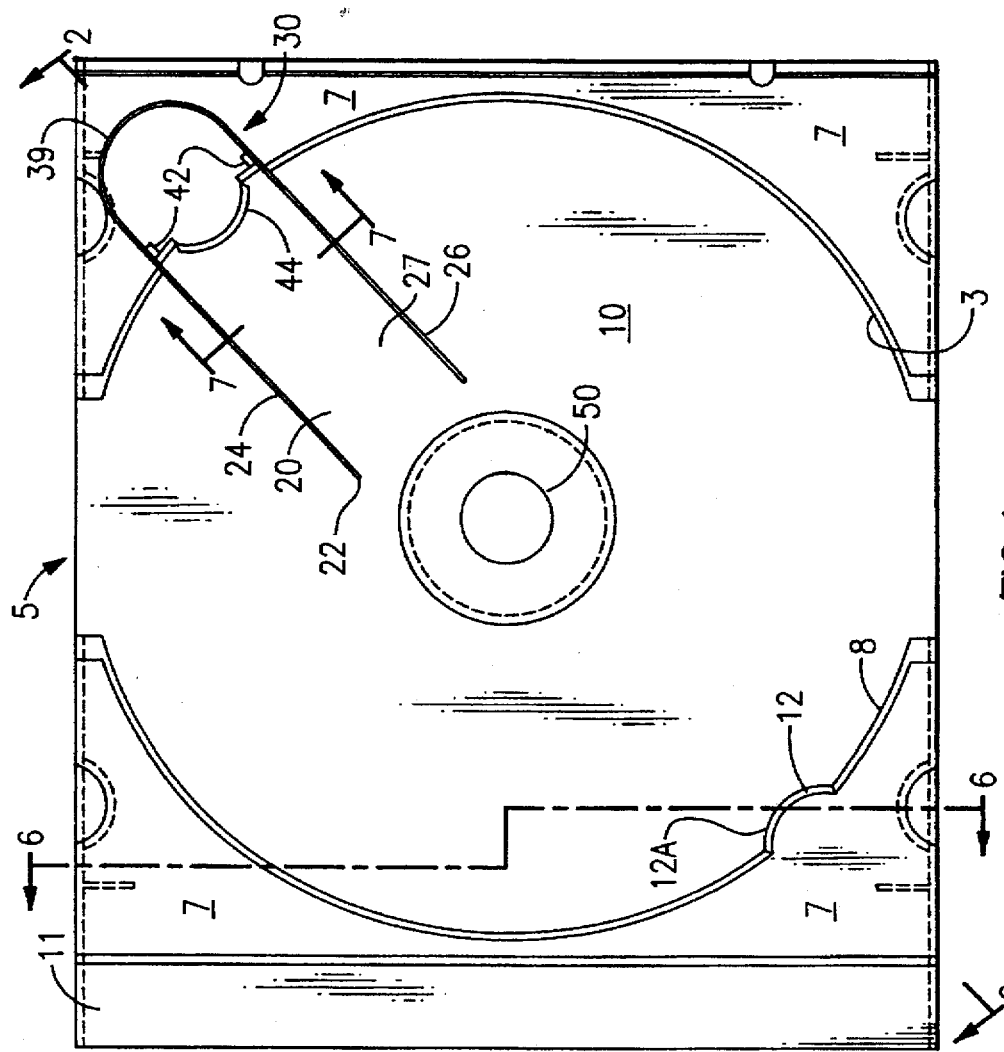

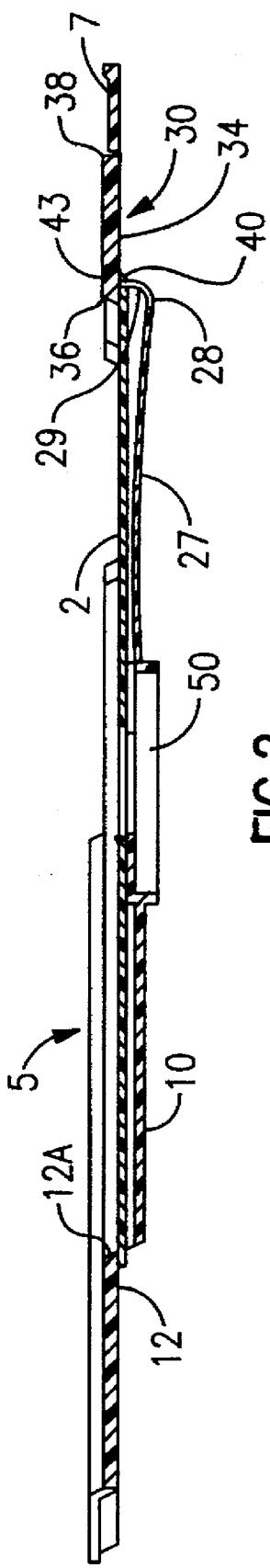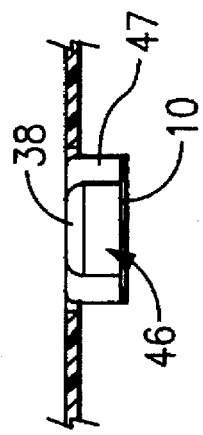

COMPACT DISC STORAGE CASE

CROSS REFERENCE TO RELATED APPLICATION

This application is a continuation-in-part of application Ser. No. 08/366,625, filed Dec. 30, 1994 now U.S. Pat. No. 5,533,615.

FIELD OF THE INVENTION

The present invention relates to storage containers, and more particularly to a disc storage container which may be used to hold circular discs removably in place using a multiple point retention system. The invention further provides for the removal of a disc from the storage container by the use of a button and flexible tab.

BACKGROUND OF THE ART

Certain disc storage containers have heretofore been used to hold a variety of discs including compact discs, laser discs, information discs, and gramophone plates, saw blades, and the like. Such holders have relied on either a single point retention system consisting of a central "claw" holder or a multiple point retention system utilizing a bolt or latch system. These devices have not given their users the opportunity to control adequately the actual release of the disc from the holder. The claw mechanism extends upward from a base surface usually somewhat larger than the diameter of the disc and provides a plurality of fingers pointed inwardly around a circle. A disc having a central hole therein is placed in the case and the hole is centered over the claw mechanism. The disc is manually pressed down over the claw thereby providing a fiction retention fit. When the user wishes to remove the disc from the holder, he or she must grasp the edge of the disc in at least two places, usually on opposite sides of the disc, and pull upward to overcome the retaining friction of the claw mechanism. This mechanism has the drawback that the nature of the claw requires a necessarily tight fit with the center hole of the disc. A flexible compact disc can break if the hole size is slightly smaller than the holder designer has anticipated. Moreover, the claw teeth can break off under repeated use. Where a conventional claw retention mechanism is used with fragile discs this can result in damage to discs. Where a conventional circular saw blade is to be retained in the storage container, it may be painful to remove the disc by grasping the edge containing the teeth to overcome the friction fit of a claw mechanism on the center hole. Additionally, it is a very inconvenient mechanism where only one hand is usable, since typically, a user must hold the edge of the container with one hand and grasp opposite sides of the disc with at least two fingers of the other hand.

A compact disc storage case, described in U.S. Pat. No. 5,533,615 by the same inventor as the present application (the disclosure of which is incorporated by reference herein), utilizes a multiple point retention system incorporating a flexing tab which holds the disc in a receptacle. While this system has proven advantageous over prior designs, it has become evident that it would be desirable to increase the degree of flexion of the tab, which in turn would reduce the risk of plastic failure at the point where flexion occurs. Accordingly, spreading out the flexion force over a greater surface area of plastic may reduce the failure risk. Additionally, such a spreading of force would reduce the amount of force needed to move the tab to release the disc. Reducing the number of points of contact with the disc may also reduce the possibility of scratching the disc.

SUMMARY OF THE INVENTION

Generally described, the present invention provides a storage container for holding a disc using a two point edge retention system. The container has a planar surface with a circular recessed receptacle defined therein capable of retaining a disc. A lip at the periphery of a portion of the container extends over the receptacle and holds a disc when it is slipped under the lip.

An elongated tab associated with the planar surface terminates in a curved portion, to which is attached a button. The button on its top portion has a lip portion which extends over the edge of the receptacle. The lip and the button lip portion act in concert to retain a disc within the receptacle. When the button is depressed the elongated tab flexes, causing the button lip portion to recede from over the edge of the disc, thereby permitting a disc that has been placed within the recess to be removed. A center rim extends upward from the container bottom and supports the disc in place.

Accordingly, it is a principal object of the present invention to provide a retention system for removably holding a compact disc in a case.

It is an additional object of the present invention to provide a manual control mechanism for retaining and releasing a compact disc in a case.

It is a further object of the present invention to provide a manual opening mechanism on a disc storage system using a fixed first retention lip and a second pivotable retention lip, the second lip being attached to a pivotable button, which in turn is attached to an elongated flexible tab.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which:

FIG. 1 is a top plan view of a disc storage container according to the present invention.

FIG. 2 is a side cross sectional view of a disc storage container along line A—A of FIG. 1.

FIG. 3 is a top plan detail view of the button mechanism of the preferred embodiment of the present invention.

FIG. 6 is a side cross sectional view of the container along line C—C of FIG. 1.

FIG. 7 is a side cross sectional view of a detail portion of the button area.

DESCRIPTION OF THE PEERED EMBODIMENTS

Figure 4:
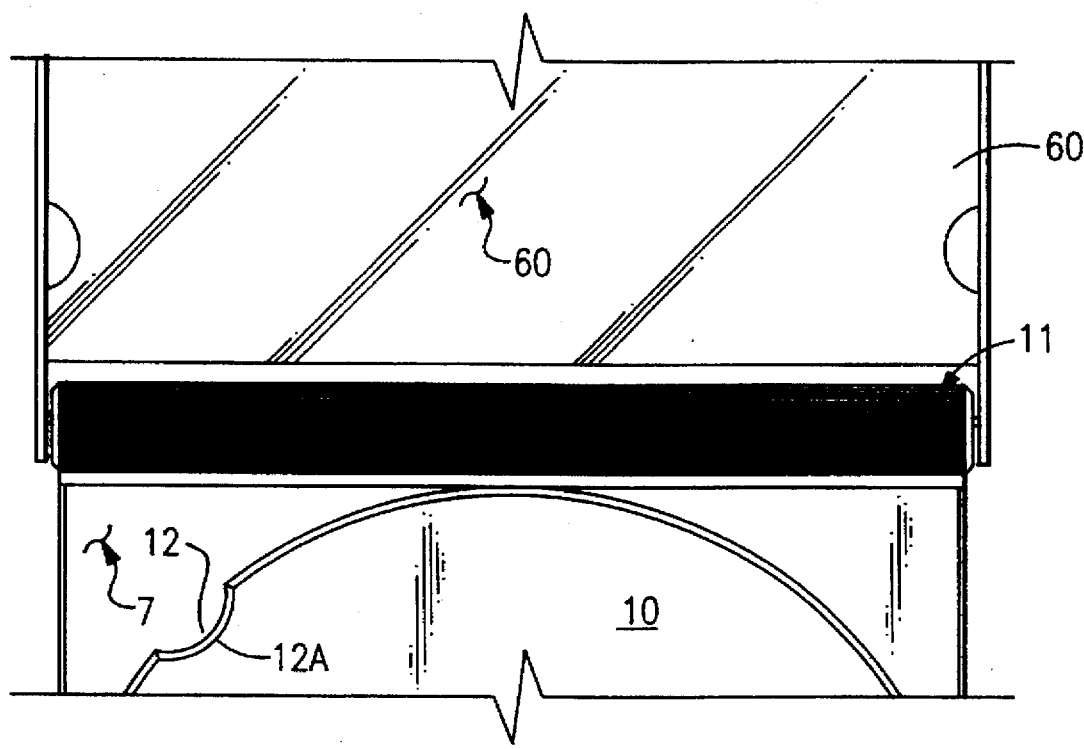
FIG. 4 is a top plan view in partial cutaway showing the cover as hingedly attached to the container.

Referring to FIGS. 1–7, a disc 2 can be removably retained within a disc storage container 5, the container 5 having a main surface 7 having a side wall 8 and a coplanar recessed planar surface 10, the recessed planar surface 10 and side wall 8 defining a generally recessed receptacle 3 for holding the disc 2. The disc 2 can be any rigid or semi-rigid disc-shaped object, including, but not limited to laser discs, compact discs, gramophone and record discs, informational discs, saw blades, washers, seals and gaskets, and the like. In the present example, the contemplated disc is a standard audio or data compact disc 2. The recessed receptacle 3 is necessarily slightly larger in diameter than the disc 2 retained therein. A grip 11 is slightly above planar surface 7 and is positioned along one edge of the container 5. In a preferred embodiment, grip 11 has a textured surface for easy grasping.

A lip 12 extends horizontally from planar surface 7 inward toward the center of the receptacle 3 and a portion 12A of the lip 12 extends over the recessed receptacle 3. In a preferred embodiment, the planar surfaces 7 and 10, grip 11 and lip 12 are injection molded plastic. The lip 12 loosely engages a portion of a disc 2 as it is slipped under it and into the receptacle 3.

An elongated tab 20, associated with and part of the surface 10, is defined by a connected portion 22, a first side 24, a second side 26, a middle portion 27, a curved portion 28 and an end 29. Because the first side 24, second side 26 and end 29 are not connected to the surface 10, the tab 20 can flex out of the plane of the surface 10, imparting a spring-like quality to the tab 20. The bottom surface of the curved portion 28 rests on the surface 10. The curved portion 28 allows for reduced-stress flexion of the tab 20, particularly at the end 29 area, by spreading out over the surface of the tab 20 the flexing force.

A button 30 comprises a top surface 32, a bottom surface 34, a front end 36 and a rear end 38. The button 30 is attached to the end 29 of the tab 20 at front end 36 portion of the bottom surface 34, either by welding, gluing, or, the button can be molded as part of the tab 20. Preferably, the button 30 top surface 32 is raised slightly above the main surface 7 and is positioned within a cutout area 39 of the main surface 7. In this manner, the button 30 projects above the main surface 7 facilitating a user depressing the button 30.

A pair of gussets 40 and 42, preferably formed as part of the tab 20 and button 30 (but, can be attached thereto) are disposed at the juncture of the tab 30 and the end 29. The gussets 40 and 42 are preferably triangular in shape and add increased strength to the joint when the button 30 is depressed. In a preferred embodiment, button top surface 32 has a textured surface, indicated by ridges 43, to aid in grasping the button 30.

The button 30 has a portion 44 which overhangs the receptacle 3. The button 30 is preferably positioned opposite the lip 12, though the location is not critical.

FIG. 7 shows an optional aperture 46 defined by an optional U-shaped member 47. Member 47 projects vertically upward from the surface 10 as a molding access area during the molding process. This member 47 permits the button 30 to be formed by the injection mold process. The rear end 38 of the button 30 extends into the aperture 46.

Preferably, a projection 50 extends upward from the center of the recessed receptacle 3 to support the disc 2 above the surface 10. The projection 50 is not critical to the function of the invention, and may be omitted if desired. It's purpose is to keep the bottom data-encoded surface of disc 2 from contacting the surface 10 and becoming scratched.

Figure 5:
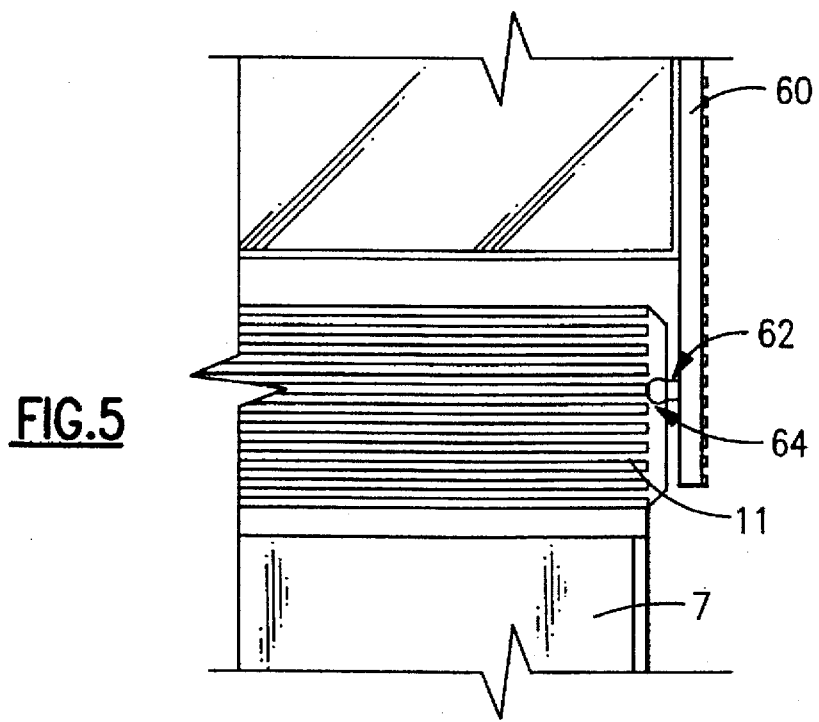
FIG. 5 is a detail view of a portion of FIG. 4.

As shown in FIGS. 4 and 5, a rectangular cover 60, known in the art and commercially available is hingedly mounted to one edge of the container surface 7 by a set of pins 62 that fit within a set of recesses 64 in the side wall of the main surface 7. In a preferred embodiment, the components of the invention are injection molded plastic. Other materials, such as ceramics, wood, metal, and the like are possible. The hinged cover 60 is not critical to the invention as this may be molded into oblong packaging or as the manufacturer sees fit.

In use, a user holds a disc 2 by its edge and inserts it under the lip 12 and into the recessed receptacle 3. The user then presses downward slightly on the button 30. The lip 44 lifts upward and outward allowing the disc 2 to fall into the receptacle 3 and be held in place by the portion 44. As the tab 20 flexes, the middle portion 27 flexes upward and the terminal end 38 pivots downward, pivoting the back of the portion 44 upward and slightly away from the disc 2. The engagement of the portion 44 and the lip 12, together with the wall 8, maintain the disc 2 in position within the receptacle 3 of the container 5.

When a user wishes to remove the disc 2, he/she depresses the button 30, causing upward flexion of the tab middle portion 27 and downward pivoting of the end 28, until the portion 44 is moved up and away from the disc 2 edge, thereby releasing the disc from engagement with the portion 44. The user then grasps the disc 2 by its edge and slides it out from under the lip 12 and out of the receptacle 3.

An advantage of the present invention is that there is substantially no stress placed on the disc when removing it from the container 5, as compared with the stress placed on the disc when being removed from conventional cases incorporating a center claw retention design. The single small lip 12 design reduces the amount of plastic used and reduces the possibility of the disc 2 being caught under a longer lip if the disc 2 were removed at too great an angle prior to sliding it out from under a retaining lip. The elongated tab 20 provides increased flexion attributes than previously known because of the larger surface area which can absorb the flexing stress without snapping.

While the most common use of the present invention is to hold conventional compact discs, containing audio, visual and other electronic data information, it is to be understood that other disc-shaped objects can be used, such as, but not limited to, circular saw blades, large washers, seals and gaskets, and the like. Moreover, the container 5 can be adapted to be used with discs having non-planar shapes.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A holder for removably storing a disc, comprising:
   a container having top, bottom, left and right sides, a top planar surface and a bottom planar surface, said top planar surface having a recessed receptacle defined therein capable of receiving a disc-shaped object;
   a first retention means associated within said planar surface for retaining said disc, comprising a lip projecting horizontally from said top planar surface partially over said receptacle;
   a second retention means proximate to said receptacle for retaining said disc comprising,
     an elongated tab extending horizontally from said bottom planar surface,
     a button having generally flat top and bottom surfaces, a front edge protruding over said receptacle and a rear edge, said button being attached to said tab, whereby when said button is depressed, said tab flexes.

2. The apparatus of claim 1, further comprising a projection extending upwardly from said planar surface capable of supporting said disc in said receptacle.

3. The apparatus of claim 1, wherein said button top surface is textured.

4. The apparatus of claim 1, further comprising a cover comprising a lid having four sides and a top and bottom surface and having a pair of side walls extending parallel from two of said sides, each side wall having an inwardly extending protrusion capable of matingly being received within a corresponding pair of indentations in said top and bottom sides of said container, whereby when said protusions are frictionally engaged with said indentations, the tab/indentations form a pivot point around which said cover can pivot to cover said container top surface.

* * * * *